United States Patent [19]
Zuercher

[11] 3,852,944
[45] Dec. 10, 1974

[54] LAWN EDGER
[75] Inventor: William T. Zuercher, Marshalltown, Iowa
[73] Assignee: Copper Manufacturing Company, Marshalltown, Iowa
[22] Filed: May 7, 1973
[21] Appl. No.: 357,521

[52] U.S. Cl. .................... 56/12.2, 56/256, 172/15
[51] Int. Cl. ............................................. A01d 69/00
[58] Field of Search ................... 56/12.2, 12.8–13.3, 56/256; 172/14, 15

[56] References Cited
UNITED STATES PATENTS

| | | | |
|---|---|---|---|
| 2,176,175 | 10/1939 | George et al. | 56/12.2 |
| 2,504,416 | 4/1950 | Hileman | 56/12.2 |
| 2,531,081 | 11/1950 | Shippey | 56/12.2 |
| 2,561,882 | 7/1951 | Patton | 56/328 R X |
| 2,621,463 | 12/1962 | Skillman | 56/16.9 |
| 2,882,668 | 4/1959 | Murillo | 56/12.8 |
| 3,141,507 | 7/1964 | Henry et al. | 172/15 |
| 3,475,887 | 11/1969 | Price | 56/13.3 |
| 3,679,003 | 7/1972 | Wadsworth | 56/256 |

*Primary Examiner*—Russell R. Kinsey
*Attorney, Agent, or Firm*—Molinare, Allegretti, Newitt & Witcoff

[57] ABSTRACT

A lawn edger including a wheel frame movable over the ground is provided with gasoline powered drive means which emits exhaust gases under pressure. Rotatably carried on the frame are blade means that are adapted to be driven from the drive means. The blade means are adapted to be rotated about an axis transverse to the direction of movement of the frame. Deflector means are provided on the frame rearwardly of the blade means. A conduit connected to the muffler of the drive means conducts exhaust gases from the drive means and discharges same across the surface rearwardly of the deflector means and in front of the rear wheel means of the frame so as to blow debris thrown by the blade means and deflected by the deflector means from the surface transversely of the direction of movement of the wheeled frame.

6 Claims, 5 Drawing Figures

PATENTED DEC 10 1974
3,852,944
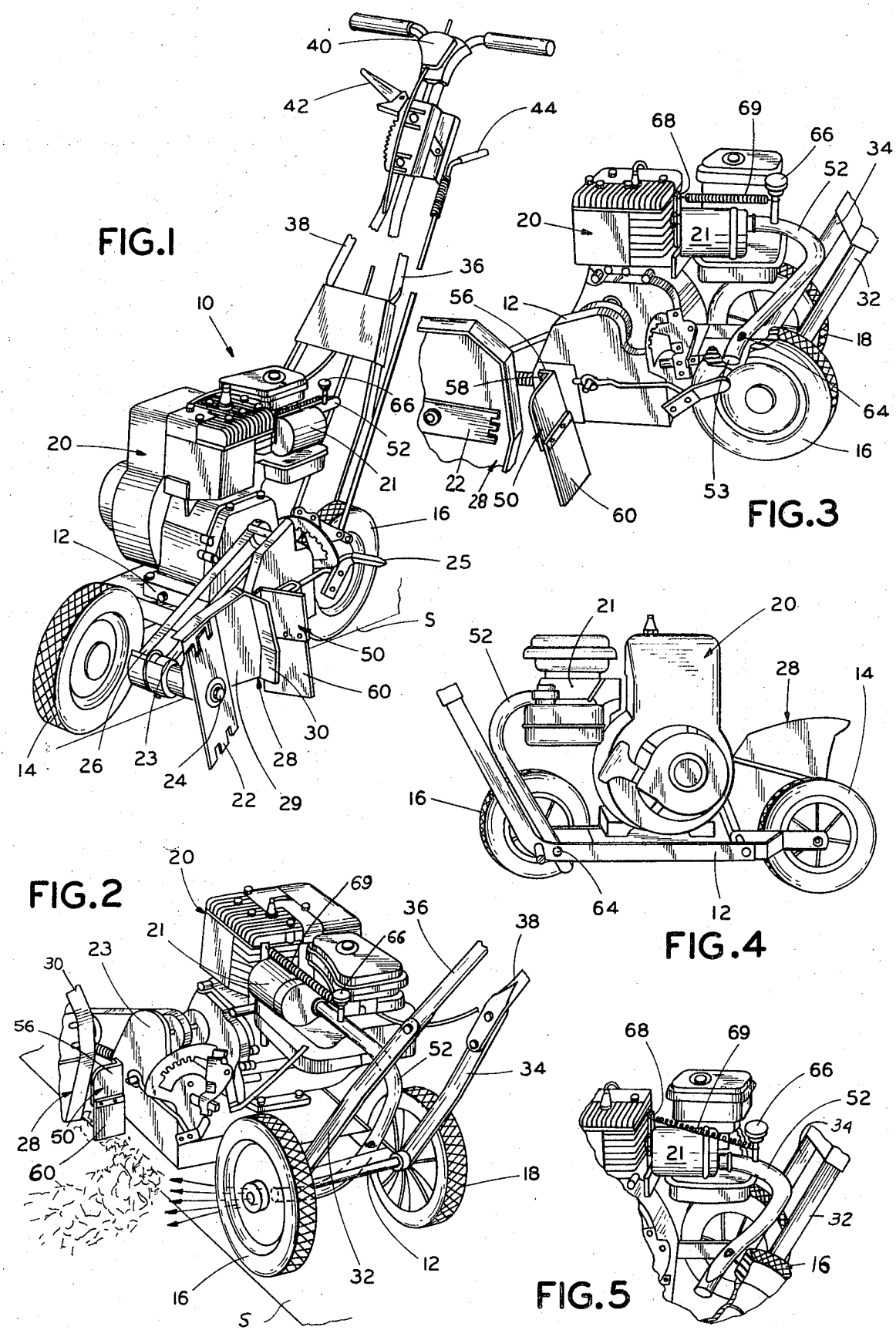

LAWN EDGER

SUMMARY OF THE INVENTION

This invention relates to a powered lawn edger and more particularly, to an improved powered lawn edger having rotary blade means for cutting and edging a lawn, a deflector rearwardly of the rotary blade means for intercepting debris, and conduit means having an outlet rearwardly of the deflector for discharging exhaust gases from the drive means of the lawn edger so as to blow the debris transversely of the path of travel of the lawn edger.

Lawn edgers to trim the edge of the grass adjacent the sidewalk or street, for example, are known. The Hedrick U.S. Pat. No. 2,664,809 shows a lawn edger having a curved deflector disposed rearwardly of a rotary cutting blade. McBride U.S. Pat. No. 1,644,068 discloses a similar construction. Neither of these references incorporates exhaust gas blower means for clearing the surface over which the lawn edger is moving, of the debris. Price U.S. Pat. No. 3,475,887 suggests the use of a suction collection means to collect debris, but there is no suggestion of the novel deflector and exhaust gas blower construction contemplated by applicant. McDonough et al. U.S. Pat. No. 2,791,082 reveals a power lawn edger with an electric motor utilizing fan blades to blow the clippings from the sidewalk. Australian Pat. No 214,915 shows a lawn mower wherein exhaust gas is utilized to blow grass clippings into a hopper rearwardly of the lawn mower.

The known prior art fails to disclose a lawn edger having the novel combination of parts proposed herein. The prior art does not suggest an improved lawn edger which comprises a wheeled frame movable over a surface along a path of travel, with the wheeled frame having drive means emitting exhaust gases under pressure. The lawn edger includes blade means rotatably carried on the frame and adapted to be driven by the drive means, the blade means being rotatable about an axis transverse to the path of travel of the frame. Disposed rearwardly of the blade means on the frame and extending transversely of the path of travel are deflector means. Conduit means connected to the drive means conduct the exhaust gases from the drive means and discharge same across the surface rearwardly of the deflector means so that debris thrown by the blade means will be deflected by the deflector means to the surface and then the debris will be blown transversely by the exhaust gases. The conduit means has an outlet terminating forwardly of the rear support wheels on the wheel frame so as to clear the debris from the surface before the rear support wheels pass over same and cause adherence of the debris to the surface.

An object of the present invention is to provide an improved lawn edger wherein the deficiencies and disadvantages of prior constructions are obviated.

Another object of the present invention is to provide an improved lawn edger incorporating deflector means rearwardly of the blade means and conduit means connected to the drive means for conducting exhaust gas from the driver means and discharging same across the surface over which the lawn edger moves rearwardly of the deflector means so as to blow debris from the surface onto the lawn by use of the exhaust gases from the driver means.

Other objects and advantages of the present invention will be more apparent hereinafter.

BRIEF DESCRIPTION OF THE DRAWING

There is disclosed in the attached drawing a presently preferred embodiment of the present invention wherein like elements in the various views are referred to by like reference numerals and wherein:

FIG. 1 is a left front perspective view of the lawn edger embodying principles of the present invention;

FIG. 2 is a left rear perspective view of the lawn edger of FIG. 1, with parts broken away;

FIG. 3 is a left side elevation view of the lawn edger illustrating the operative association of the rotary cutting blade, the deflector, and the outlet of the conduit means that communicates exhaust gases from the muffler of the drive engine to the surface over which the lawn edger travels to blow debris therefrom;

FIG. 4 is a right side elevation view of the lawn edger, with parts broken away, illustrating the location of the conduit means that conducts exhaust gases from the muffler to the surface over which the lawn edger travels; and FIG. 5 is a detail view illustrating the detachable connection of the conduit means to the muffler outlet.

DETAILED DESCRIPTION OF THE DRAWING

Referring to FIG. 1 there is illustrated a lawn edger 10 embodying the principles of the present invention. The lawn edger 10 comprises a frame 12 rotatably supporting a wheel 14 forwardly thereof and a pair of wheels 16 and 18 rearwardly thereof.

Carried on the frame 12 is a drive means 20, which in the illustrated form of the invention, comprises a four-cycle gasoline engine. The drive means 20 is adapted to be connected to a rotary cutting blade 22 journalled in cutter head assembly 23 on the frame 12 by means of a belt and pulley drive arrangement 26. The cutter head assembly 23 is adjustable as will be explained hereafter so as to selectively position the cutting blade in a vertical plane or at an angle to the vertical. Cutting blade 22 is secured to shaft or axle 24 joined in the end of the cutter head assembly 23. The blade rotation is commenced upon actuation of clutch 25, which is foot operated. A sector housing or blade guard 28 is secured to the cutterhead assembly 23 for partially covering the rotating blade 22 and preventing cut material or debris from being hurled toward the operator. The housing 28 incorporates an upright portion 29 and a peripheral portion 30 extending transversely thereto.

Extending upwardly and rearwardly from the frame 12 are a pair of link members 32 and 34 which are connected to link members 36 and 38 that define a handle having outwardly or transversely bent portions at the upper end. Disposed on the handle are suitable throttle control means 40 for regulating the speed of the drive means 20, control 42 for regulating the height of the cutting blade 22 relative to the grass to be trimmed by adjustment of the front wheel 14 relative to the frame and a control 44 for controlling the angle of tilt of the cutting blade 22. Normally, the cutting blade 22 will be rotatable about a horizontal axis in a vertical plane. The cutting blade 22 can be adjusted so as to cut at an angle to the vertical or even in a horizontal plane if desired for trimming.

It will be noted that the front wheel 14 may be movable transversely toward and away from the cutting blade so as to provide better balance during two-wheel operation on curbs where the lawn slopes downwardly towards the curb.

In operation of the lawn edger as described thus far, it has been found that debris accumulates on the surface rearwardly of the cutter blade. It is thus necessary to go back over the surface with a broom or the like to clean the debris from the surface, normally a sidewalk or street, in order to provide a desirable clean aesthetically pleasing appearance. As a solution to the problem, applicant provides a deflector 50 rearwardly of the cutting blade 22 for intercepting debris that is thrown rearwardly and deflecting same to the surface over which the lawn edger is passing. The debris fall loosely to the surface. Conduit means or blower tube assembly 52 conducts exhaust gases from the muffler 21 of the drive means 20 and discharges same against the surface S rearwardly of the deflector 50 and before the wheels 16, 18. The location of the deflector 50 and the outlet of the conduit means 52 has been found to be very important to produce the desired result. For example, if the outlet of the conduit means 52 is disposed behind the wheel 16 some grass clippings and other debris may be pressed into the surface and these will not be blown from the surface by the exhaust gases from the lawn edger 10. Positioning the outlet so as to direct the exhaust gases forwardly of the wheel 16 and rearwardly of the deflector 50 assures that the surface will in fact be blown clean under normal operation.

With reference to FIGS. 3 and 4, there is illustrated further detail of the novel lawn edger constructions. The deflector 50 comprises a bracket portion 56 secured to the wheeled frame 12 by means of bolts or the like fastening means and a resilient deflector portion 60 depending downwardly therefrom. The deflector 50 is disposed generally transversely to the frame 12 and trnnsversely to the direction of travel of the lawn edger 10 and the portion 60 extends into contact with surface S.

The conduit means 52 is adapted to be detachably connected to the muffler so as to render the conduit means 52 inoperative if desired. With the upper end of the conduit or debris blower tube 52 in the muffler outlet, exhaust gases from the driver means 20 will be passed through the tube 52 and discharged from the outlet end 53 thereof. With the inlet of the debris blower tube 52 removed from the outlet of muffler 21, exhaust gases will be discharged to the atmosphere in a conventional manner.

The conduit means 52 is secured to the frame 12 pivotly at a single point by means comprising a screw and nut 64. Adjacent the inlet end of the tube 53 that is adapted to cooperate with the muffler 21 there is secured a knob 66. A spring anchor clamp 68 is connected to the driver means adjacent the muffler 21. Disposed between the spring anchor clamp 68 and the knob 66 is a spring member 69. With the inlet end of the conduit means 52 positioned in the muffler outlet, the spring 69 will tension the knob 66 and the tube 52 so as to retain the parts in operative association. When it is desired to render the blower tube assembly 52 inoperative, the knob 66 can be pulled rearwardly of the muffler 21 so as to disengage the inlet of the tube 52 from the muffler and the knob 66 is then moved transversely so as to move the inlet of tube 52 transversely of the outlet from muffler 21 thereby permitting the exhaust gases to be discharged to the atmosphere. The latter position of the conduit means is illustrated in FIG. 5. The desired movement of the conduit means 52 is permitted by its single pivotal connection to the frame 12.

In use the drive means 20, which may comprise a four-cycle Briggs and Stratton engine, is started by pulling the rope start in usual fashion. The V-belt clutch 25 is actuated to engage the belt drive means 26. The lawn edger 10 is propelled forwardly over the surface in a path of travel along the edge of the lawn to be edged. Some debris will be thrown rearwardly of the housing 28 and will contact the deflector 50 and be dropped onto the surface S. With the blower tube assembly 52 in the position shown in FIGS. 1-4, exhaust gases from the drive means 20 will pass through the muffler 21 into the conduit means 52 and be discharged from the outlet end 53 adjacent the surface to be cleaned and forwardly of the rear wheel 16 so as to blow the debris tranversely of the direction of movement of the lawn edger prior to the time that the debris is compressed by rear wheel 16. At the initial trimming operation, there may be an excess of debris such that it can not be fully blown from the surface, however, it has been found that if the lawn is edged periodically, then the combination of the deflector 50 together with the blower tube assembly will effect a proper and aesthetically desirable removal of the debris from the surface over which the lawn edger passes without the necessity for subsequent cleaning operation.

There has been provided by the present invention an improved lawn edger that embodies a deflector rearwardly of the rotating cutting blade and a discharge blower tube assembly receiving exhaust gases from the driver means of the lawn edger and discharging same onto the surface rearwardly of the deflector so as to clear the debris prior to passage of the rear wheel over such surface. The deflector means and blower assembly are components that can be added to a basic lawn edger with a minimum of time and expense. The overall assembly neatly edges the turf along sidewalks, driveways, curbs and saves much hard labor.

The invention is not necessarily limited to the preferred embodiment illustrated and described, and comprehends such minor changes in construction that may be permitted within the scope of the appended claims.

What is claimed is:

1. A lawn edger comprising a wheeled frame movable over a surface in a first direction, drive means on said frame emitting exhaust gas under pressure, blade means rotatably carried on said frame and adapted to be driven by said drive means, said blade means rotatable about a substantially horizontal axis, deflector means on said frame rearwardly of said blade means, and extending transversely of said blade means, said deflector means comprising a bracket secured to the frame and a resilient flap secured to the bracket and extending transversely relative to the frame for intercepting debris hurled rearwardly by the blade means, and conduit means having an inlet portion connected to said drive means and having a frame supported portion within an outlet for conducting exhaust gas from the driver means and discharging same across said surface rearwardly of the deflector means, whereby debris thrown by the blade means will be deflected by the deflector means to said surface and then said debris will be blown away by the exhaust gas.

2. A lawn edger as in claim 1 wherein the wheeled frame has rear support wheel means, said conduit means having an outlet terminating forwardly of the axis of rotation of the rear support wheel means.

3. A lawn edger as in claim 1 wherein the lower edge of the resilient flap is in contact with the surface.

4. A lawn edger as is claim 2 wherein the conduit means is removably secured to the drive means.

5. A lawn edger as in claim 4 wherein the drive means comprises a gasoline engine.

6. A lawn edger as in claim 5 wherein the gasoline engine includes a muffler having an outlet opening therein, biasing means cooperating with said conduit means, the conduit means being biased so as to retain the inlet portion thereof in engagement with the muffler, whereby when the conduit means is in the outlet opening, exhaust gas will pass into the conduit means and be discharged from the outlet, said inlet portion of the conduit means being movable from said muffler to permit discharge of exhaust gas directly to the ambient.

* * * * *